(12) United States Patent
Harris

(10) Patent No.: US 7,305,075 B2
(45) Date of Patent: Dec. 4, 2007

(54) TELEPHONE CALL MESSAGING DEVICE

(76) Inventor: Timothy M. Harris, 5755 Lawton Loop East Dr., Unit 2, Indianapolis, IN (US) 46216

( * ) Notice: Subject to any disclaimer, the term of this patent is extended or adjusted under 35 U.S.C. 154(b) by 431 days.

(21) Appl. No.: 11/005,235

(22) Filed: Dec. 6, 2004

(65) Prior Publication Data

US 2005/0169445 A1 Aug. 4, 2005

Related U.S. Application Data

(63) Continuation of application No. 10/197,128, filed on Jul. 17, 2002, now Pat. No. 6,853,710.

(51) Int. Cl.
*H04M 1/56* (2006.01)
(52) U.S. Cl. .............................. 379/142.01; 379/88.21; 379/212.01
(58) Field of Classification Search ................ 370/389; 379/88.19, 142.01
See application file for complete search history.

(56) References Cited

U.S. PATENT DOCUMENTS

| | | | |
|---|---|---|---|
| 4,071,690 A | 1/1978 | Joannou | |
| 4,125,743 A | 11/1978 | O'Boyle et al. | |
| 4,214,123 A | 7/1980 | Daegnelie | |
| 5,228,073 A | 7/1993 | Smith | |
| 5,327,486 A | 7/1994 | Wolff et al. | |
| 5,481,594 A | 1/1996 | Shen et al. | |
| 5,485,370 A | 1/1996 | Moss et al. | |
| 5,524,137 A | 6/1996 | Rhee | |
| 5,625,682 A | 4/1997 | Gray et al. | |
| 5,742,905 A | 4/1998 | Pepe et al. | |
| 5,754,629 A | 5/1998 | Kunimori et al. | |
| 5,835,577 A | 11/1998 | Disanto et al. | |
| 5,859,903 A | 1/1999 | Lee | |
| 6,067,355 A | 5/2000 | Lim et al. | |
| 6,088,696 A | 7/2000 | Moon et al. | |
| 6,148,066 A | 11/2000 | Di Santo et al. | |
| 6,222,913 B1 | 4/2001 | Cho | |
| 6,333,973 B1 | 12/2001 | Smith et al. | |
| 6,404,856 B1 | 6/2002 | Wilcox et al. | |
| 6,404,860 B1 | 6/2002 | Casellini | |
| 6,438,216 B1 | 8/2002 | Aktas | |
| 2002/0018549 A1 | 2/2002 | Burg | |
| 2002/0191600 A1* | 12/2002 | Shah et al. ................. | 370/389 |

FOREIGN PATENT DOCUMENTS

EP 0812097 A2 10/1997

* cited by examiner

*Primary Examiner*—Gauthier Gerald
(74) *Attorney, Agent, or Firm*—Woodard, Emhardt, Moriarty, McNett & Henry LLP

(57) ABSTRACT

A messaging device is disclosed. The device is connected to a telephone line and communicates with other devices identical to itself via a communications link established over existing phone lines, power lines or via wireless communications mechanisms. The messaging device records caller ID data upon detection of an incoming telephone call and prompts the user to enter additional data regarding the caller in assembling a message data packet including predefined messages. The message data packet is then transmitted to an identical messaging device wherein the caller ID data, caller name, caller's company, and predefined messages are presented to the intended recipient of the message contained in the message data packet. Additional features include handwritten or typed detailed messages contained in said message data packet and security for preventing unauthorized viewing of message data. The messaging device is optionally integrated into the design of a telephone.

13 Claims, 10 Drawing Sheets

TELEPHONE CALL MESSAGING DEVICE

CROSS REFERENCE TO RELATED APPLICATIONS

This application is a continuation application of U.S. application Ser. No. 10/197,128, filed Jul. 17, 2002 now U.S. Pat. No. 6,853,710 entitled TELEPHONE CALL MESSAGING DEVICE.

FIELD OF THE INVENTION

The present invention relates generally to electronic communication devices and more particularly to devices for use in an office environment for transmitting and receiving messages relating to telephone calls.

BACKGROUND OF THE INVENTION

An office receptionist is nearly always responsible for answering the company telephone and writing down the name and telephone number of the caller, the date and time of the call, as well as the name of the person for whom the written message is prepared. In a typical telephone call the person answering the phone records the date, time, name of the caller, name of the person who will receive the message, and any additional information to be conveyed in the message. For the convenience of the receptionist, pads of paper with form blanks for date, time, and names and additional predefined messages such as "returned your call", "will call again", "wants to see you" and the like, with check boxes adjacent to the predefined messages, are available from office supply stores. Adhesive backed memo pads are also available wherein the memo can be stuck to a surface as a result of the adhesive on the underside of the paper surface.

Normally, the written message is placed in a message holder with employee names attached thereto, and employees pick up their messages at the receptionist desk at their next convenience. Alternatively, the receptionist might physically deliver the messages to the office of the recipient, or secretaries may attend to this task. In either scenario, valuable work time is lost while employees transport small pieces of paper with simple messages around the office. Occasionally, the receptionist needs to deliver the message immediately to the recipient, particularly if the recipient is already using the phone in his/her office, is in a meeting and does not wish to receive telephone calls, or if there is some urgency associated therewith. When immediate delivery is required, physical delivery of the message is inconvenient and distracting in regard to the receptionists other duties and forces the receptionist to forego other duties.

There are computer based messaging systems that utilize a personal computer for receiving telephone message data input from the receptionist and transmitting the messages to the recipient's computer via local area networks. However, if the recipient's computer is not powered on, or a network problem exists, or a power outage occurs and backup batteries are not in use, or the appropriate programs are not running on the recipient's computer, such a computer based messaging system fails to provide that which is needed, a messaging system for conveying telephone call messages. In addition, where a personal computer is not needed to carry out an employees job responsibilities, the cost of a personal computer is not justified simply for receiving telephone call messages or memos.

In smaller organizations wherein various employees may be responsible for answering telephone calls, it becomes necessary for each employee to have available a telephone message memo pad and write down telephone memos or messages when calls are received. Further, the memos must be delivered to the appropriate recipient, and again, a loss of working time is generated delivering memos around the office to the recipient.

What is needed is a device that provides added convenience to the user in creating electronic telephone messages or memos and dispatching same to the appropriate recipient immediately. Such a device should take advantage of existing office wiring and telephone systems so that installation and use thereof is relatively inexpensive. In addition, the device should include electronics to automate the entry of some of the necessary data, such as date and time of the call, as well as telephone caller ID data.

SUMMARY OF THE INVENTION

A messaging device, according to one aspect of the present invention, comprises processor means including RAM, input control lines, output control lines, a real time clock for generating date/time data and ROM for storing and executing a computer program, electronic display means connected to output control lines of the processor for displaying visual information to a user, the display means receiving display data signals from the processor and producing a display in accordance therewith, input means connected to the processor for receiving input commands from the user and supplying the input commands to the processor, communications means for establishing a data communications link with other messaging devices, caller ID detection means connected to a telephone line for detecting caller ID data when a telephone call occurs and supplying the caller ID data to the processor, and wherein the processor performs the following steps: receiving the caller ID data when a telephone call occurs; displaying a formatted screen on the electronic display means including the caller ID data, the date/time data corresponding to the time the call was received and form blanks for the user to enter additional data regarding the telephone call subject matter, the formatted screen also including a check list of predefined messages having blank check boxes adjacent to each predefined message; receiving message data from the user via the input means and displaying same on the formatted screen, the message data including additional information regarding the caller and the users selections of one or more of the predefined messages and the destination address of a messaging device corresponding to a messaging device used by the intended recipient of the message data; receiving a send input from the user via the input means; transmitting a message data packet comprised of the caller ID data, the date/time data for the call and the message data via the communications means to a recipients messaging device for display thereon; receiving and storing message data packets received from other messaging devices via the communications means; displaying one of the message data packets received from other messaging devices on the electronic display means; and receiving message navigation commands from the user via the input means and displaying one of a plurality of stored message packets on the electronic display means in accordance with the message navigation commands.

One object of the present invention is to provide a convenient mechanism for electronically exchanging telephone call messages.

Another object of the present invention is to eliminate telephone message paper slips.

Still another object of the present invention is to automate the delivery of telephone messages to a group of recipients.

These and other objects of the present invention will become more apparent from the following description of the preferred embodiments.

DESCRIPTION OF THE PREFERRED EMBODIMENT

Figure 1:
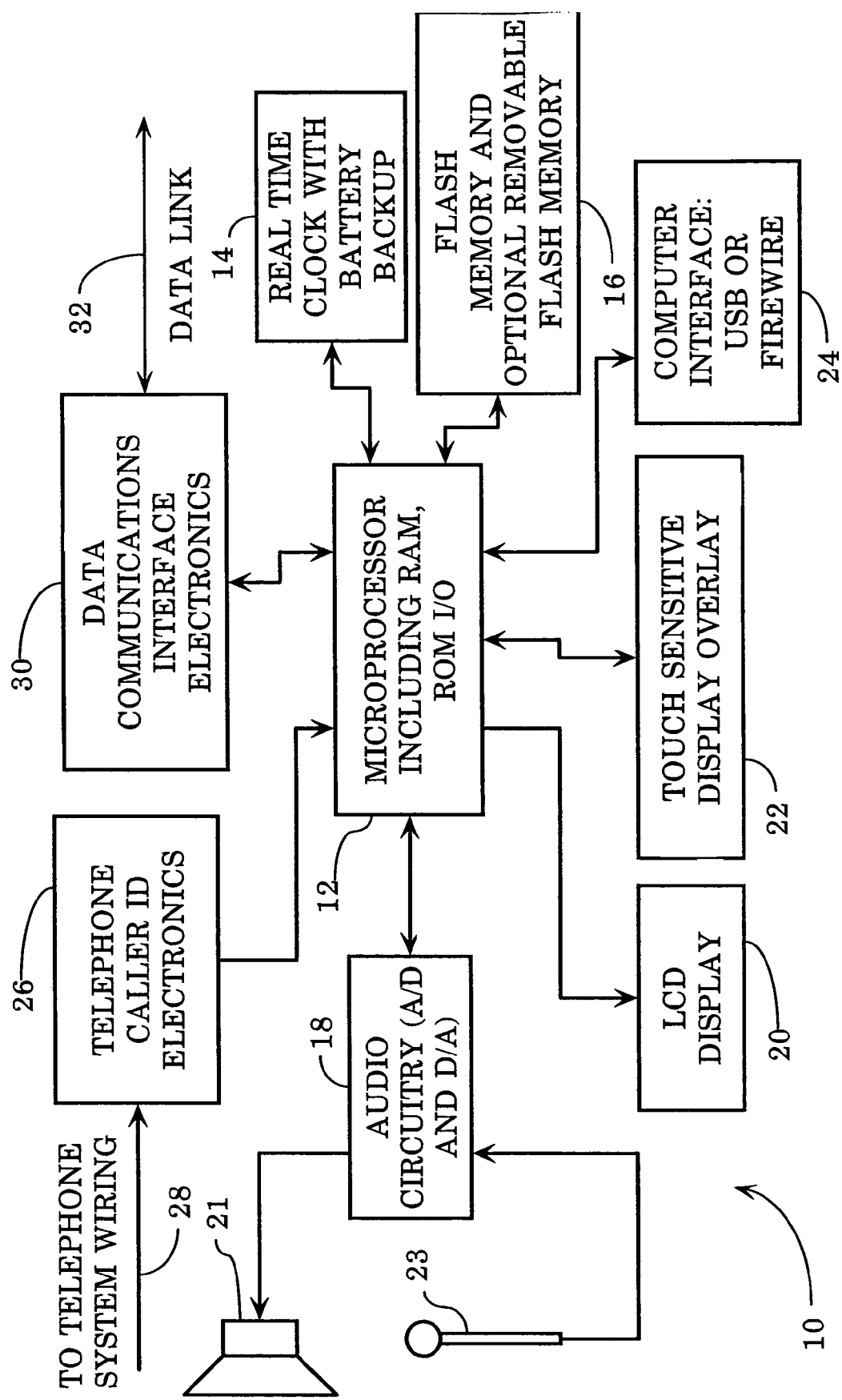
FIG. 1 is a block diagram of a telephone call messaging device according to the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to FIG. 1, a block diagram for a telephone messaging device 10 according to the present invention is shown. Messaging device 10 includes a microprocessor 12 or microcomputer having RAM, ROM, and I/O (input/output) that comprises the controller of device 10. Real time clock 14 provides date/time data to microprocessor 12. Real time clock 14 includes a battery backup feature so that a power loss does not result in loss of the correct date/time. A flash memory device 16 contains sufficient storage space for storing a large quantity of data. Flash memory device 16 is contemplated as fully integrated or removable in design such as removable compact flash media cards used in current products such as digital cameras for storage of image files. Such memory devices are now very reasonable in cost for as much as 64 megabytes of storage. Audio circuitry 18 includes the necessary electronics such as a/d (analog to digital) and d/a (digital to analog) converters for microprocessor 12 to digitally reproduce audio on speaker 21 and record audio signals in digital form from microphone 23. Alternatively, the audio electronics in circuitry 18 may be comprised of CODECS (coder/decoders) well known in the art of cellular phone technologies for efficient recording and playback of digitized audio. (It is contemplated that a reduced cost version of device 10 may be produced without audio messaging capability thereby eliminating the need for audio components 18, 21 and 23). A liquid crystal display (LCD) 20 receives signals from microprocessor 12 and responds by displaying graphical images on display 20. LCD display 20 is a graphical electronic display device similar to those found in PDA (portable digital assistant) devices. A touch sensitive display overlay 22 input device is positioned directly over display 20 and provides a mechanism for the user to input data to microprocessor 12. Touch sensitive display overlay 22 and related technologies are also found in PDA devices such as the Palm Pilot® PDA. A computer interface 24 provides the mechanism for microprocessor 12 to communicate with external devices such as personal computers or PDAs. Computer interface 24 is preferably a USB (Universal Serial Bus) or Firewire® (IEEE 1394) interface developed for use in inter-computer communications to provide a very fast communications link between intelligent devices. Telephone caller ID electronics 26 includes circuitry for detecting caller ID data provided by a telephone company over the local telephone lines. Caller ID electronics 26 is connected to the telephone system wiring via cable 28 and provides caller ID data to microprocessor 12 upon receipt of such information from the telephone company over cable 28. A data communications interface 30 includes electronics for establishing communications with other telephone messaging devices identical to device 10 via data link 32. The data communications interface 30 and data link 32 are implemented by use of technologies for sending and receiving data packets over existing power lines, telephone wiring, network cabling, or via radio frequency technologies such as wireless LAN (local area network) technologies. Such technologies are well known and one skilled in the art may readily implement any of the various communications technologies that do not require additional wiring be installed in a facility to establish communications between intelligent devices. It is also contemplated that standard networking protocols such as the TCP/IP suite of networking components are used to transmit and receive data over data link 32.

Computer interface 24 is also an alternative mechanism by which alphanumeric data may be entered by the user of messaging device 10. A computer program driver on a personal computer redirects keyboard input from the computer via interface 24 to messaging device 10 for data entry in the various textbox GUI (graphical user interface) program objects described below.

Figure 2:
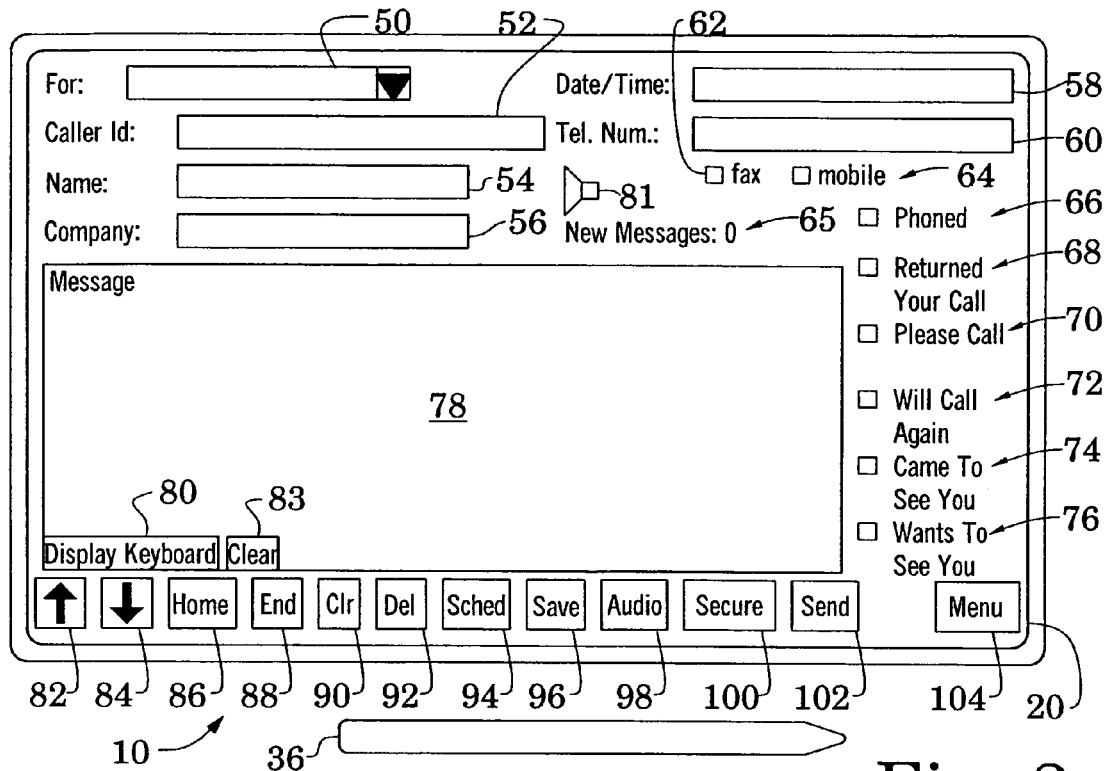
FIG. 2 is a plan view of a telephone messaging device according to the present invention.
Figure 3:
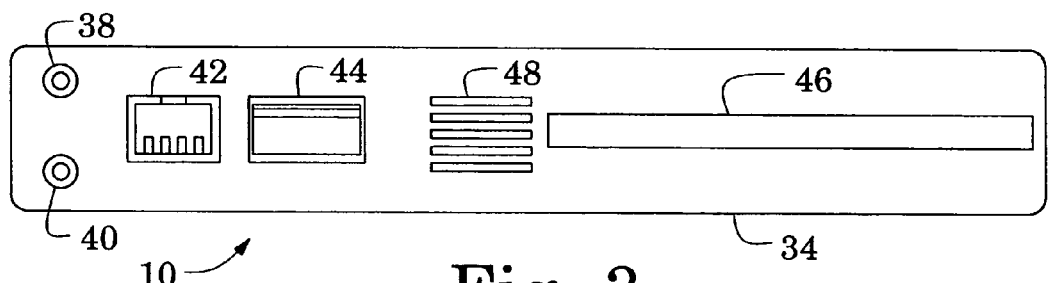
FIG. 3 is a rear elevational view of the telephone messaging device of FIG. 2.
Figure 4:
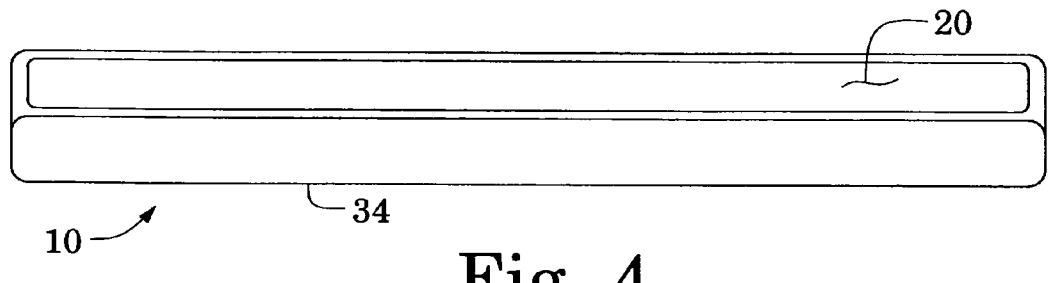
FIG. 4 is a front elevational view of the telephone messaging device of FIG. 2.

Referring now to FIGS. 2-4, a telephone messaging device 10 according to one aspect of the present invention is shown. Messaging device 10 is contained within case 34 made from plastic or other suitable material. Graphical display 20 is shown in FIG. 2 with one display configuration or screen in accordance with the primary operating mode of device 10. A touch sensitive overlay 22 (that is transparent) is positioned over display 20 and provides input signals to microprocessor 12 when stylus 36 is depressed on top of the overlay 22. Software mapping techniques are implemented to associate regions of the overlay with graphical program objects shown on display 20. A PDA operating system such as Windows CE from Microsoft Corporation is contemplated as one potential GUI solution for creation of the software and graphical programming objects discussed in relation to messaging device 10.

Referring now to FIG. 3, a rear elevational view of messaging device 10 is shown. From this perspective, the external connections to device 10 are shown. In particular, a power connector 38, a microphone jack 40, a telephone system connector 42, a USB interface connector 44, a compact flash media card slot 46, and a small grill area 48 behind which speaker 21 is positioned are all shown.

Referring now to FIG. 4, a front elevational view of the messaging device 10 is shown. This view depicts the slight inclination angle at which the display 20 is positioned so that it is more readily viewed by the user. It is contemplated that the angle of inclination of the display may vary over a wide range.

Figure 9:
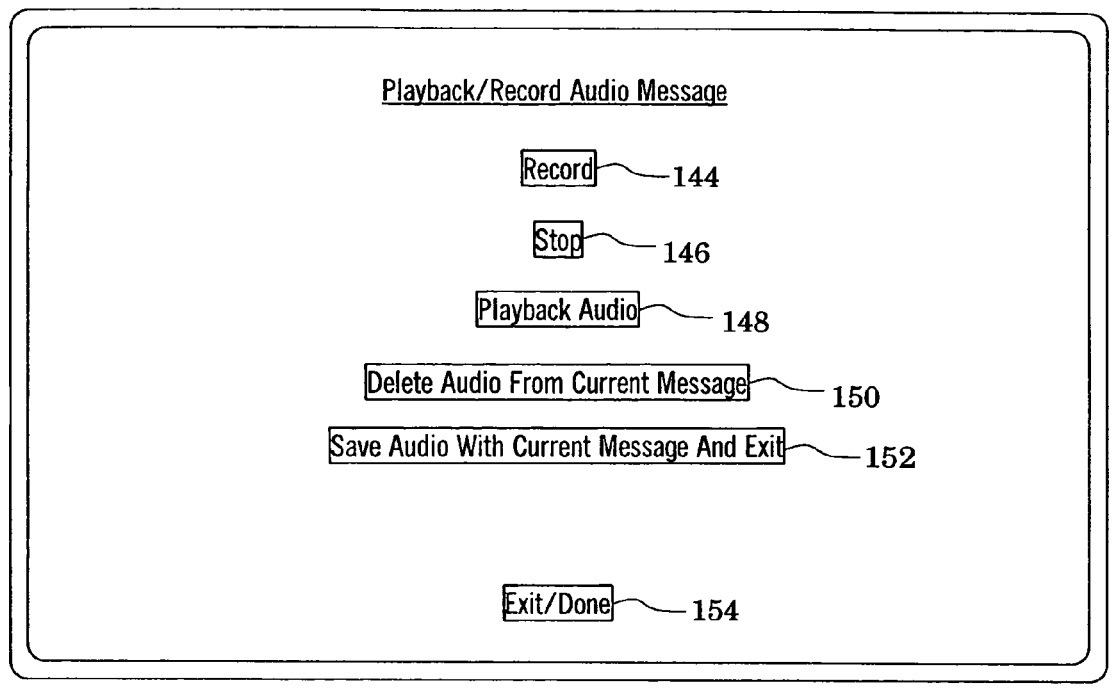
FIG. 9 is a plan view of the telephone messaging device depicting the audio playback/record screen.

Referring back to FIG. 2, the various visual elements or GUI objects displayed on display 20 will now be described. As in a PDA, the underlying graphical elements shown are typical components of a GUI (graphical user interface) well known in the computing industry. A recipient drop-down listbox 50 provides a mechanism for selecting those messaging devices that will receive a message data packet created by messaging device 10. Recipients may include individuals or groups of individuals. Defining groups is discussed below. Alternatively, listbox 50 is a "multi-select" type listbox allowing for selection of multiple entries in listbox 50 thereby enabling the selection of multiple individual recipients and/or multiple groups that will receive a particular message data packet. Typically listbox 50 is populated with names of persons corresponding to messaging devices (during setup a messaging device 10 is assigned a name corresponding to the person who will be using the device) and group names. Textbox 52 is provided for displaying caller ID information received by microprocessor 12 via telephone caller id electronics 26. Textbox 54 displays user input information regarding the name of the telephone caller's name. Textbox 56 displays company name of the caller entered by the user. Textbox 58 is a date/time text box that is automatically populated with date/time data when a telephone call is received (microprocessor 12 becomes aware of a new telephone call when caller ID electronics 26 provides caller ID data to microprocessor 12). Alternatively, textbox 58 displays the date/time of a current message being displayed by device 10. Upon detection of a telephone call microprocessor 12 obtains the current date/time from real time clock 14 and enters that data into textbox 58. Textbox 60 receives user input data regarding the caller's telephone number if that number is different from that shown in textbox 52. A plurality of checkboxes with corresponding descriptions are provided that enable the user with a single tap of stylus 36 on the checkbox or the text adjacent the checkbox to enable or disable the mark within the checkbox (typically an "X") in the corresponding checkbox. These checkboxes include a FAX checkbox 62, a MOBILE checkbox 64, and checkboxes corresponding to a plurality of predefined messages including PHONED checkbox 66, RETURNED YOUR CALL checkbox 68, PLEASE CALL checkbox 70, WILL CALL AGAIN checkbox 72, CAME TO SEE YOU checkbox 74 and WANTS TO SEE YOU checkbox 76. A message area 78 provides region of the display 20 wherein a custom handwritten message may be entered by the user regarding the telephone call. Information entered into the message area 78 includes additional information useful to the recipient of the message regarding the telephone caller's purpose or business. Message data is entered in message area 78 by printing or writing on the area with stylus 36 or tapping the DISPLAY KEYBOARD pushbutton 80. Printed or handwritten messages are converted to a digital data format and the data is compressed for efficiency in storing the data to memory device 16. A variety of compressed digital graphical image formats such as JPEG (named after the group Joint Photographic Experts Group that developed the file format), GIF (graphs interchange format) and TIFF (tagged image file format) are well known and used for compressing and storing graphical images such as the data input from touch sensitive display overlay 22 that defines handwritten messages in the present invention. Handwriting recognition software is optionally included to transform the handwritten message into alphanumeric data. Handwriting to ASCII conversion software is well known in the art. Tapping pushbutton 80 causes an alphanumeric data entry screen to appear on display 20 as shown in FIG. 7. Tapping CLEAR pushbutton 83 will clear or erase handwriting or typed data entered into message area 78. A plurality of graphical pushbuttons (GUI visual program objects) are provided to activate various functional actions provided by messaging device 10. UP ARROW pushbutton 82 and DOWN ARROW pushbutton 84 provide message navigation forward and backward in the current message list stored by microprocessor 12 and displayable on display 20. Similarly the HOME pushbutton 86 and the END pushbutton 88 enable rapid movement to the first or last message available for display, respectively. CLR pushbutton 90 instructs microprocessor 12 to clear the display of all data in preparation for entering new data or for protecting the data from view by others. DEL pushbutton 92 instructs microprocessor 12 to delete the currently displayed message from memory. SCHED pushbutton 94, corresponding to the word "schedule", signals microprocessor 12 to display a reminder data input screen where the user enters date/time and message data instructing microprocessor 12 in regard to a future date/time wherein a reminder message is displayed. SAVE pushbutton 96 causes microprocessor 12 to save the message data packet for the currently displayed message into another area of permanent flash memory 16. AUDIO pushbutton 98, when tapped by a stylus, instructs microprocessor 12 to display an audio playback/record screen and command buttons as shown in FIG. 9. SECURE pushbutton 100 instructs microprocessor 12 to enable a password security feature for the currently displayed message. Upon tapping pushbutton 100, the user is prompted to enter an alphanumeric password for the currently displayed message, and future attempts to redisplay that same message require the user to input the correct password before the message may be viewed. SEND pushbutton 102 instructs microprocessor 12 to assemble a message data packet including caller ID data from textbox 52, name data from textbox 54, company name data from textbox 56, date/time data from textbox 58, additional telephone number data from textbox 60, checkbox data settings for predefined messages in checkboxes 62-76, and data entered into message area 78 and send the assembled message data packet to the messaging device identified in the "For" dropdown listbox 50. MENU pushbutton 104 instructs microprocessor 12 to display the menu command screen shown in FIG. 6 on display 20.

The receipt of new messages is indicated by NEW MESSAGE textbox 65. Data in textbox 65 is altered to indicate the quantity of new messages received. Further, an audible brief beep sound is generated by microprocessor 12 via audio circuitry 18 and speaker 21 when a new message data packet is received via datalink 32. As new message are viewed, the data in textbox 65 is altered by microprocessor 12 to indicate how many messages remain to be viewed.

Audio messages may be recorded and attached to a message data packet or message record. When audio data is present in a message record, and that message is displayed that has an audio data record component, an audio indicator 81 resembling a speaker icon is shown on display 20. Other audio message attachment indicators such as an audible beep (a two tone beep serves to distinguish an audio attachment from a single beep corresponding to a new message received), flashing display indicators or a text message indicating an audio data component for the present message record are also contemplated. It is also contemplated that audio messages are automatically reproduced on speaker 21 when a message data packet or record having an audio data component is displayed by the user of device 10.

Figure 5:
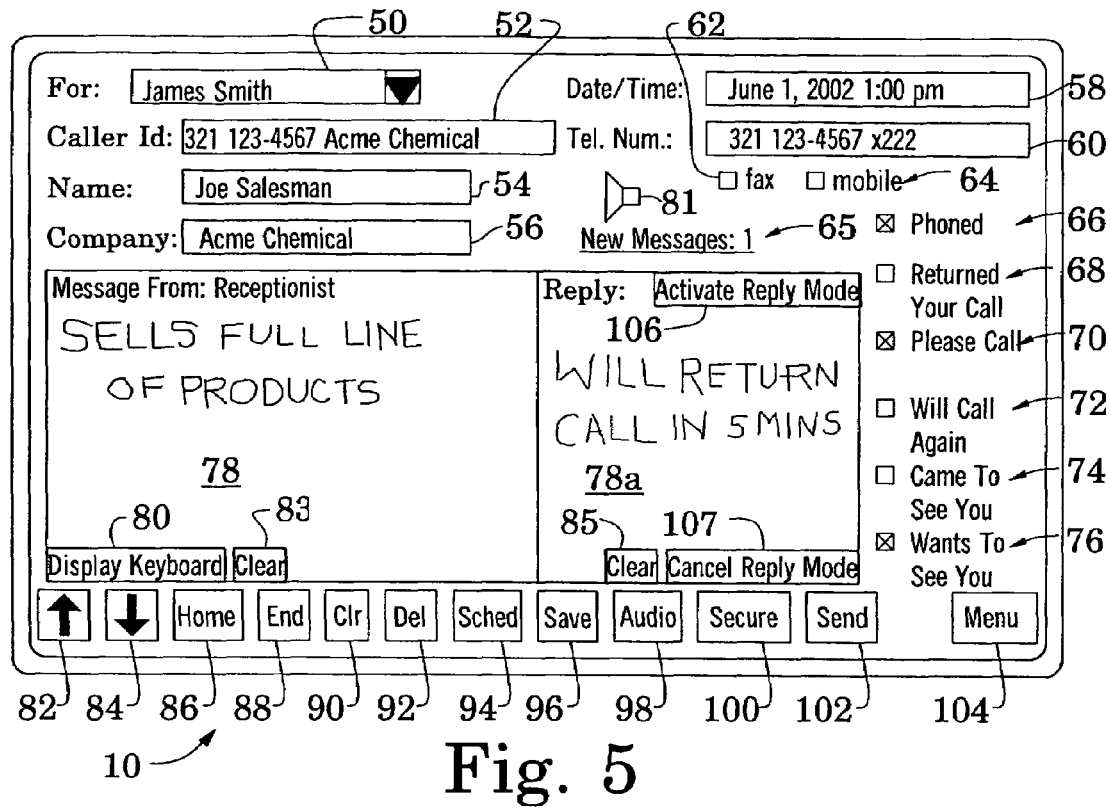
FIG. 5 is a plan view of the telephone messaging device depicting data entry screen and reply mode.

Operationally speaking, messaging device 10 will be described in accordance with the example message data shown in FIG. 5. In FIG. 5, the current message has been designated "For" James Smith as the recipient in accordance with the user selection thereof in listbox 50. In reality, this the selection of James Smith is a selection of the telephone messaging device used by James Smith and the name corresponds to a unit logical identifier or network address used in transmitting data to devices connected to datalink 32. Caller ID data is displayed automatically in textbox 52 in response to a telephone call detected by microprocessor 12 receiving data from caller ID electronics 26. The caller's name is entered by the user in textbox 54 (if different from the name appearing in the caller ID textbox 52) and the caller's company name is entered in textbox 56 if different from the caller ID data. Current date/time of the call is recorded automatically by microprocessor 12 in textbox 58. In the event the caller's telephone number differs from that shown in caller ID textbox 52, another telephone number is entered in textbox 60. As shown in the current example, checkboxes 66, 70 and 76 includes an "X" therein indicating the user has selected those predefined messages as they relate to the telephone call from Joe Salesman. A hand printed message is shown in message area 78. When the message data packet defining all the data shown in the display screen of device 10 is transmitted to another telephone messaging device (identical to device 10) pushbutton 106 with a label of "Activate Reply Mode" is displayed or made active on the recipient device.

When activated, pushbutton 106 causes microprocessor 12 to split the message area 78 into two distinct areas, with the area designated 78a identified as the "Reply" area. A hand printed, handwritten, or alphanumeric reply message is then entered at area 78a by the recipient (here James Smith, identified in textbox 50). Tapping CLEAR pushbutton 85 will clear or erase handwriting or typed data entered into message area 78*a*. The messaging device 10 in use by the originator of the message (Receptionist) then receives command data from James Smith's messaging device to enter into a "real time" data transfer mode wherein the Receptionist's messaging device displays the reply message shown in FIG. 5 in "real time", that is, as data is entered by James Smith at his messaging device in area 78*a*. The message in area 78*a* will simultaneously be displayed on the originators messaging device and the recipient's messaging device in either graphical handwriting form or in the format of alphanumeric computer generated characters based on data entered via keyboard data entry. The "real time" reply mode provides a convenient mechanism for a person to immediately notify the sender of a message in regard to information that should be conveyed without delay. While the devices are in "real time" mode, the sender (here the "Receptionist") may also enter additional data in the message area 78 and such input is immediately transmitted by microprocessor 12 to the second messaging device for immediate display. When the real time reply mode of operation is no longer needed, either party may activate pushbutton 107 to deactivate the reply mode and cease real time data exchange between the messaging devices. The real time data exchange mode is accomplished by microprocessor 12 continuously exchanging data between the two messaging devices via data communications interface electronics 30 and data link 32. NEW MESSAGES textbox 65 now depicts that a new message has been received. Various checkboxes 68, 72 74 and pushbuttons 82, 84, 86, 88, 90 92, 92, 94 96, 98, 100, 102 and 104 are also shown in FIG. 5.

A person receiving a new message may desire to add further information to a received message on occasion, and the following describes the mechanism provided by device 10 for accomplishing such. Upon receiving a message at the recipients messaging device, the user may write or print in the message area 78 or tap pushbutton 80 to display the keyboard data entry screen and append additional message information into message area 78. Microprocessor 12 appends keyboard or character data entered by the user below the existing message in area 78. Additional message information such as "will send sample products" or "new source for product" are examples of additional text information a user may enter into message area 78. Tapping the SAVE pushbutton after entering additional text in message area 78 instructs microprocessor 12 to save in memory 16 the additional message data in area 78 with the original message data record for the current displayed message.

Figure 6:
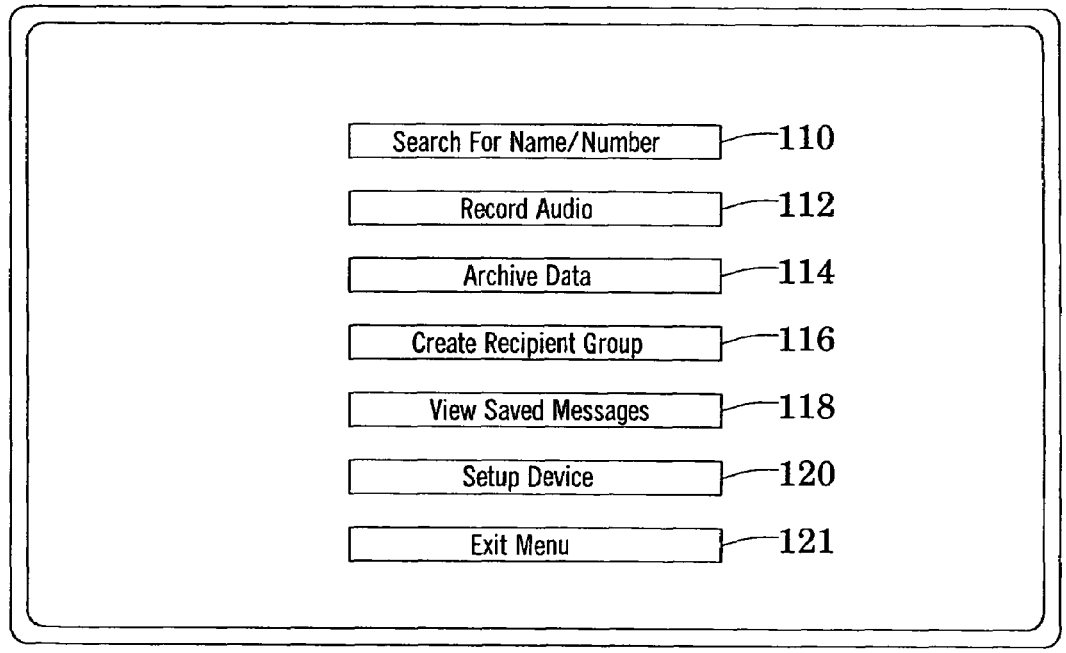
FIG. 6 is plan view of the telephone messaging device depicting the MENU screen.
Figures 7, 8:
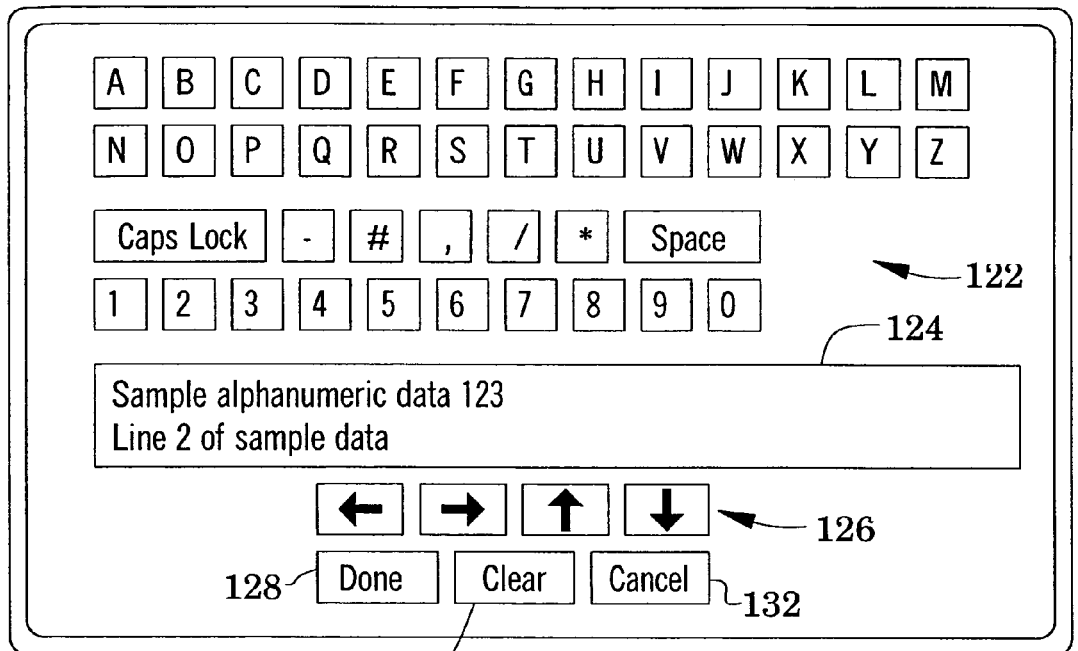
FIG. 7 is a plan view of the telephone messaging device depicting the alphanumeric data entry screen.
FIG. 8 is a plan view of the telephone messaging device depicting the name or number search screen.

Referring now to FIG. 6, a menu display screen for messaging device 10 that is displayed in response to activation of MENU pushbutton 104 is shown. In FIG. 6 an array of pushbuttons corresponding to additional features or functionality provided by messaging device 10 are shown. SEARCH FOR NAME/NUMBER pushbutton 110 instructs microprocessor to display a search screen for previously saved or stored messages containing character strings. The search feature is described in detail below in association with FIG. 8. Pushbutton 112 activates the AUDIO record/playback screen shown in FIG. 9 and described below. Pushbutton 114 provides a mechanism for archiving data. Activation of pushbutton 114 causes microprocessor 12 to transfer all message data records including message data packets, audio and reminder data packets to a removable compact flash memory card or to a personal computer via computer interface 24. Pushbutton 116, when activated, instructs microprocessor 12 to display a list of messaging devices that have been detected via device queries transmitted over data link 32. The user is then provided with a list of known messaging devices from which the user of messaging device 10 may create groups or special lists of messaging devices. The definition of groups enables the user to select a group as the recipient of a particular message and upon activation of the SEND pushbutton 102, a message is transmitted to all messaging devices listed in the group definition. Tapping pushbutton 118 signals microprocessor 12 to display "saved" message data packets. Saved messages are distinct from new or recently viewed message data packets (corresponding to entire messages) in that they are stored separately for future reference. When displaying saved message data packets or records, messaging device 10 presents the data in a format shown in FIG. 2. It is contemplated that a variety of alternative formats are conceivable for displaying information to a user of device 10. Navigation pushbuttons 82, 84, 86 and 88 are used to navigate through the messages displayed. Pushbutton 120 SETUP DEVICE, when activated, instructs microprocessor 12 to enter into a setup mode wherein the user enters a name for the messaging device (which will be the identifier name that other messaging devices will know the device as) and the date/time setup. Other options available in the setup screen may include activation/deactivation of new message audio beeps. Also provided in the menu screen is an exit pushbutton 121. Tapping EXIT pushbutton 121 causes messaging device 10 to return to a normal mode of operation as shown in FIG. 2 or to mode of displaying message data packet information as in FIG. 5 depending upon the display mode that was active prior to the activation of the menu pushbutton 104.

Referring now to FIG. 7, a plurality of pushbuttons 122 are shown that correspond to a subset of the typical alphanumeric keys of a keyboard. Alphanumeric data is entered by the user via this screen configuration. A single tap of the stylus 36 on a character pushbutton causes the corresponding letter/number/symbol to appear in textbox 124. Movement of the insertion point within textbox 124 is accomplished by the user tapping the cursor keys 126. Upon completion of entering the desired data, the user taps pushbutton 128 (DONE) to complete entry of the data. The user may clear all the data in textbox 124 by tapping pushbutton 130 (CLEAR). The user may cancel the data entry mode by tapping the CANCEL pushbutton 132. In all instances where the user may enter data into a textbox, it is contemplated that a simple stylus double-tap on any textbox discussed herein (such as textboxes 54, 56, 58 and 60 as well as messaging area 78) activates the alphanumeric data entry screen of FIG. 7 for data entry.

Referring now to FIG. 8, a search screen for messaging device 10 is shown. The search feature is activated when a user taps pushbutton 110 in the menu screen of FIG. 6. The search screen includes a textbox 134 wherein a search string is entered by the user. After entering the alphanumeric search string data in textbox 134, the user taps pushbutton 136 (SEARCH) and microprocessor 12 searches data records for messages containing the search string of textbox 134. Microprocessor 12 searches all message data packets or message records and populates list box 138 with data from those message records. The search feature includes a search of Caller ID data, caller name data, company data, and telephone number data. Wild card characters such as "*" and "?" well known in the computer art are contemplated as recognized by microprocessor 12. To display the entire saved message for any of those entries shown in listbox 138, the user taps the desired entry in listbox 138 to "select" it and then taps the DISPLAY MSG pushbutton 140. Alternatively, a single or double tap on any of the listed messages in listbox 138 instructs microprocessor 12 to display that particular message in the format of FIG. 5. When finished with the search feature, the user taps pushbutton 142 to exit the search screen and return to standard display of messaging device 10 (shown in FIG. 2 or FIG. 5).

Referring now to FIG. 9, the audio playback/record screen is shown. In this particular display screen, five audio functions are provided. Recording of audio messages is activated by tapping pushbutton 144. Audio input via microphone 23 is digitized by audio circuitry 18 and microprocessor 12 and temporarily stored in memory by microprocessor 12. A visual indicator (such as flashing on and off the text of the RECORD pushbutton) aids the user in knowing the record mode is activated. It is contemplated that audio messages will be limited in length in accordance with available unused memory storage in flash memory. Tapping the STOP pushbutton 146 halts the recording or playback process. Tapping the PLAYBACK AUDIO pushbutton 148 causes an audio message attached to a message data record to be played back via speaker 21. Tapping the DELETE AUDIO FROM CURRENT MESSAGE pushbutton 150 causes audio data attached to a message data record to be deleted. SAVE AUDIO WITH CURRENT; MESSAGE AND EXIT pushbutton 152 causes the current digitized audio message data just recorded to be saved along with all other data for the currently active message data record. Also shown is EXIT/DONE pushbutton 154 which instructs microprocessor 12 to exit the playback/record audio mode of operation and return to the modes shown in FIG. 2 or 5.

Figure 10:
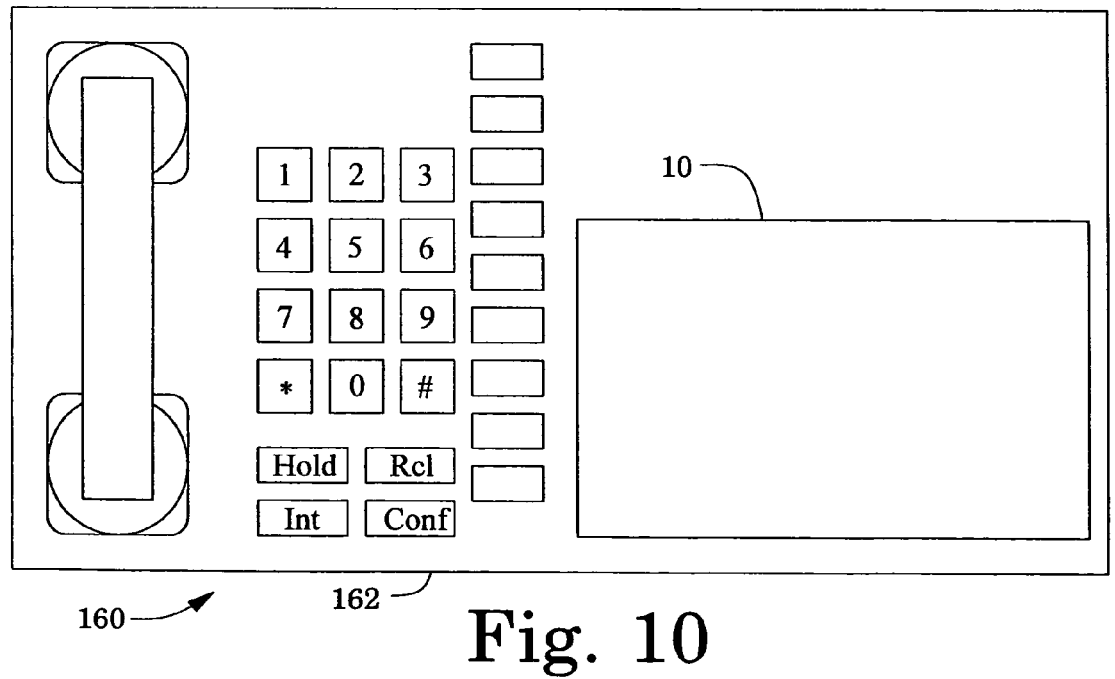
FIG. 10 is a plan view of another telephone messaging device in accordance with another aspect of the present invention.

Referring now to FIG. 10, another embodiment 160 of the present invention is shown. In this embodiment a messaging device 10 is fully integrated into a standard multiline telephone 162. Such a combination of functionality conserves desktop space.

Figure 11:
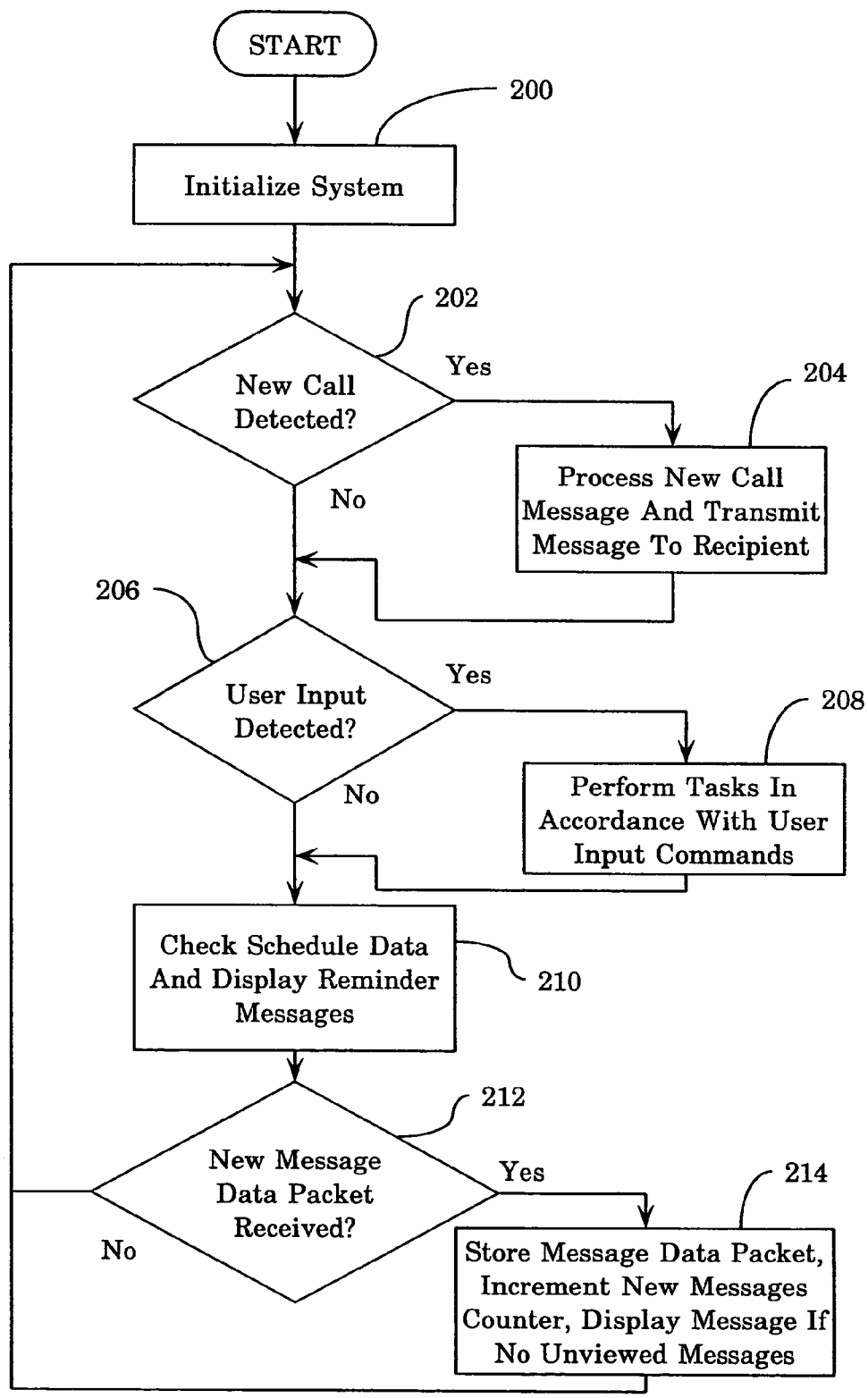
FIG. 11 is a flowchart for the main program executed by the telephone messaging device.

Referring now to FIG. 11, the main flowchart for the program executed by messaging device 10 is shown. At step 200, on power up, the system is initialized. Initialization steps include: displaying the formatted display as shown in FIG. 2; transmitting or broadcasting a device identification query message via data communications interface 30 to all other similar telephone messaging devices, any messaging devices receiving the device identification query respond by transmitting a data packet including their logical unit or device number and a name corresponding to the user of the device for entry in dropdown listbox 50; and initializing computer interface 24 and determining whether an interface with a personal computer is present and whether the keyboard of a local personal computer shall be used for alphanumeric data entry. It is contemplated that the underlying communications protocol used by device 10 periodically ascertains the existence of other devices connected to datalink 32 and updates the information in listbox 50 accordingly, much the same as the Windows operating systems implement the network "browse" functionality. Following step 200, program execution continues at step 202. At step 202, microprocessor 12 checks for new caller ID data from caller ID electronics 26. If new caller ID data is detected, program execution continues at step 204. At step 204 a new telephone call is processed, data is entered by the user as required to fully define a new message data packet and the message data packet is sent to the desired recipient messaging device as selected by the user. Step 204 is described in more detail in the discussion of the flowchart of FIG. 12. Following step 204, execution continues at step 206. If at step 202 no new call has been detected, execution continues at step 206. At step 206, if user input has been detected by microprocessor 12, step 208 is next executed. At step 208 user input is processed in accordance with the flowchart shown in FIG. 13. Following step 208 program execution proceeds to step 210. If no user input is detected at step 206 then program execution continues at step 210. At step 210 microprocessor 12 checks schedule data for reminder messages that have come due for display in accordance with reminder data packets previously stored. The details of step 210 are more fully described in relation to the discussion of flowchart of FIG. 14 below. After step 210, step 212 is executed and if any new message data packets are received from other telephone messaging devices then the message data packet is stored, the new messages counter displayed in textbox 65 is incremented and the message data packet is displayed in accordance with the format of FIG. 5. Optionally, the new message is stored and later displayed in response to activation of one of the message navigation command pushbuttons 82, 84, 86 or 88. Following step 214, execution returns to step 202. If at step 212 a new message data packet has not been received, program execution returns to step 202. It should be recognized that in the design of microprocessor based systems, receipt of communications and input data is normally interrupt driven. Input processing by messaging device 10 is shown in the FIG. 11 flowchart form for ease of understanding the operation of the device.

Figure 12:
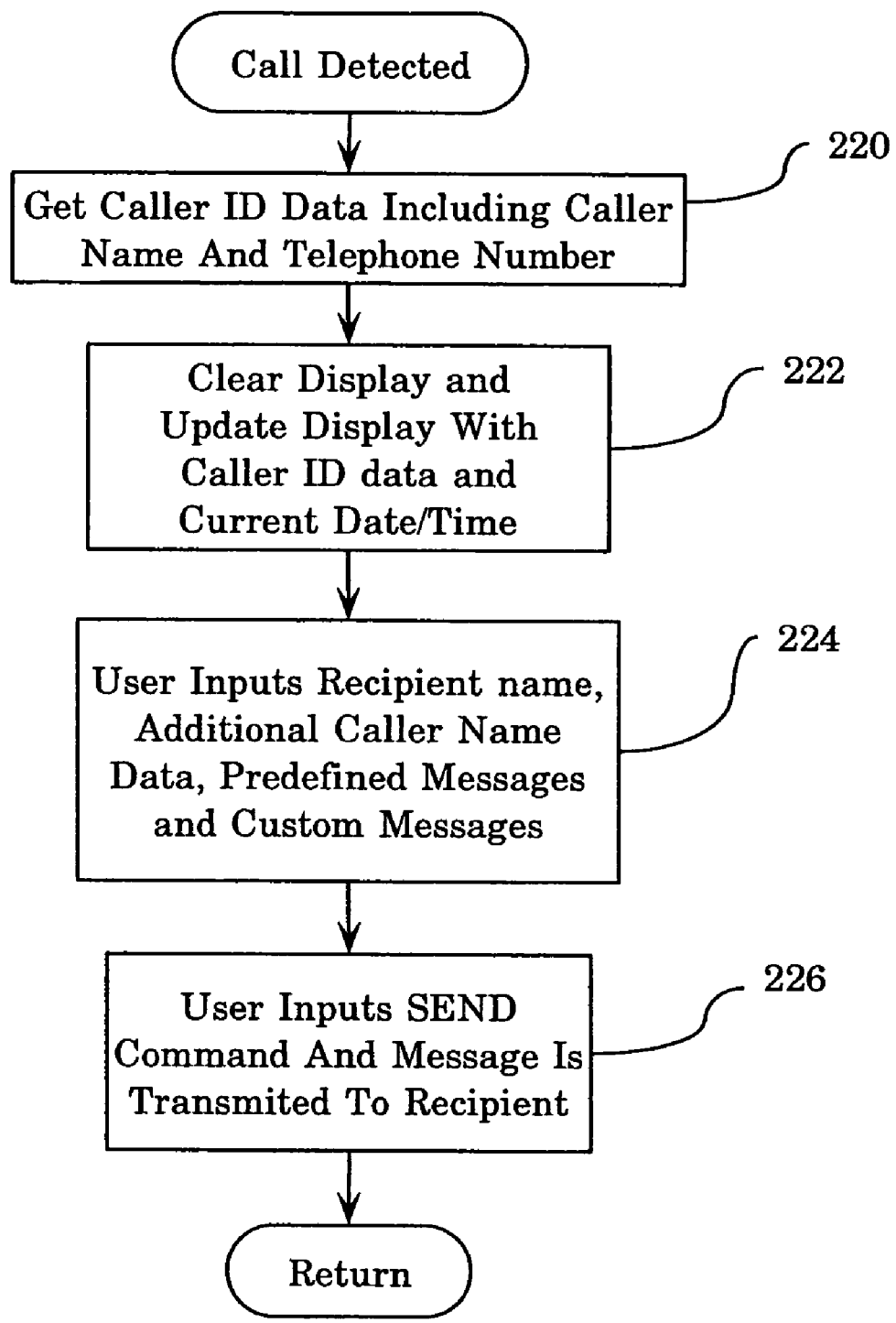
FIG. 12 is a flowchart for the Call Detected step 204 of FIG. 11.

Referring now to FIG. 12, a flowchart for the "Call Detected" step 204 of FIG. 11 is shown. At step 220, microprocessor 12 obtains caller ID data from caller ID electronics 26 including caller telephone number and caller name. Next at step 222, microprocessor 12 initializes display 20 for input of data for a new message data packet as shown in FIG. 2. Caller ID data is automatically inserted in textbox 52, date and time data is obtained from real time clock 14 and the date and time data are automatically inserted into textbox 58. Next at step 224, the user selects a recipient for the message from listbox 50, enters additional name data in textbox 54, enters company name data in text box 56, additional telephone number information in textbox 60, selects or checks predefined message checkboxes where appropriate (checkboxes 62-76) all described above in relation to FIG. 2 and FIG. 5, and enters any custom or handwritten message desired in message area 78. Next at step 226, the user taps the SEND pushbutton 102 and microprocessor 12 creates a message data packet comprised of data from textboxes 52, 54, 56, 58, 60, checkbox data from checkboxes 62-76 and any custom message data entered into message area 78 and transmits the message data packet to the messaging device (or devices in the event of a group definition in listbox 50) defined by the user selection in listbox 50. Following step 226, program execution returns to the calling routine.

Figure 13:
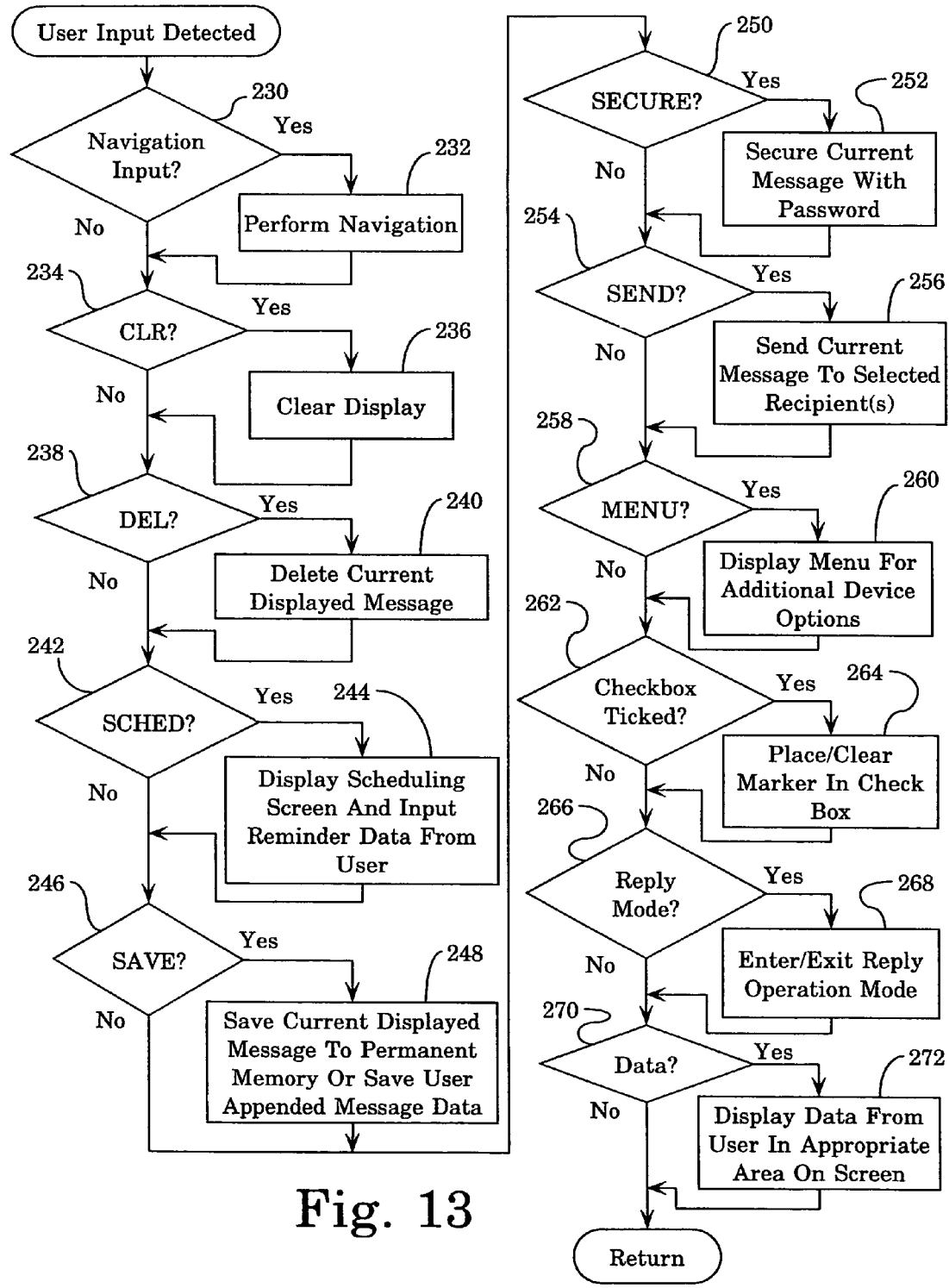
FIG. 13 is a flowchart for the User Input Command processing step 208 of FIG. 11.

Referring now to FIG. 13, a flowchart for processing user input corresponding to step 206 is shown in more detail. At step 230, microprocessor 12 tests whether the input from the user is a navigation command input corresponding to activation of pushbuttons 82, 84, 86 or 88. Such navigation pushbuttons instruct microprocessor 12 to display the message data packets for currently received or saved messages. Navigation pushbuttons include the next message pushbutton 82, previous message pushbutton 84, HOME pushbutton 86 and END pushbutton 88. If a navigation input command is detected at step 230 then execution continues at step 232 and microprocessor 12 will display a new message data packet in accordance with the navigation input command. If the user input is not a navigation input at step 230, then execution continues at step 234. Following step 232 execution continues at step 234.

If at step 234 the user input is activation of the CLR pushbutton 90, then program execution continues at step 236 and the data displayed is cleared on display 20 and a blank input screen such as that shown in FIG. 2 is displayed. After step 236 program execution continues at step 238. If the CLR command is not received at step 234, program execution continues at step 238. If a DEL pushbutton 92 command is detected at step 238 then program execution proceeds with step 240 where the currently displayed message is cleared from the display and the corresponding message data packet for the message is deleted from memory by microprocessor 12. Optionally, a "delete confirmation" message may be displayed requiring the user confirm the delete operation. Preferably, messaging device 10 would then display the next unviewed message if any message data packets are as yet unviewed by the user. If at step 238 the user input is not a DEL command, program execution continues at step 242. After step 240, execution continues at step 242. If a SCHED pushbutton 96 command is detected at step 242, program execution continues at step 244. In step 244, microprocessor 12 displays a scheduling data input screen and prompts the user to enter date/time and additional text message data to be displayed at the future date/time specified. The user enters such data and a reminder data record is created therefrom by microprocessor 12 and stored in flash memory 16. After step 244, execution continues at step 246. If the user input at step 242 is not a SCHED command, execution continues at step 246.

At step 246 user input is compared with the SAVE command or activation of pushbutton 96, and if the command is detected, program execution continues at step 248. At step 248, the currently displayed message data packet on screen is permanently saved to flash memory as a "saved" message data packet (as opposed to temporarily stored message data packets received from any messaging devices). Alternatively, if the user has appended keyboard entered data or handwritten text in message area 78, tapping the SAVE pushbutton 96 instructs microprocessor 12 to save the user modified data shown in message area 78 into memory 16 for the message currently displayed on display 20, whether the message is a permanently saved or temporarily stored message data packet. Following step 248 execution continues at step 250. If at step 246 the user input is not a SAVE command, execution continues at step 250. At step 250, if the user input is a SECURE command (pushbutton 100) then execution continues at step 252 and microprocessor 12 displays a password entry screen on display 20 wherein the user enters an alphanumeric password that is coupled with the message data packet for the currently displayed message, securing the current message from view by others. Subsequent attempts to display or delete a password protected message data record will require entry of the correct password before hand. After step 252, execution continues at step 254. If the user input is not a SECURE command at step 250, execution continues at step 254.

If at step 254 the user input command is identified as a SEND command corresponding to the user tapping pushbutton 102, execution proceeds to step 256. At step 256, microprocessor 12 creates a message data packet comprised of all data input by the user in the various textboxes and checkboxes, message data from the message area 78, caller ID data, and date/time data and transmits the message data packet to the messaging device identified by the recipient identifier data in listbox 50. Again, the recipient identifier may be a group of messaging devices. After step 256, execution continues at step 258. If at step 254 the user input is not a SEND command, execution continues at step 258. If at step 258 the user input command is a MENU command (pushbutton 104) then execution continues at step 260. If the MENU command is not detected at step 258 execution continues at step 262. At step 260, microprocessor 12 displays the menu of additional commands and features shown in FIG. 6. Following step 260 execution continues at step 262.

At step 262 if the user input indicates that the user has tapped one of the checkboxes (62-76) then the display is updated to toggle or invert the state of the checkbox and corresponding data is updated in memory. Following step 264 execution continues at step 266. If the user input at step 262 is not a "checkbox ticked" command then execution continues at step 266. If a Reply Mode command is detected at step 266 then execution continues at step 268 wherein the current reply mode state of operation is inverted, either entering or exiting reply mode of operation discussed above. For example, if the reply mode is currently active then the reply mode is deactivated, and vice versa. Following step 268 execution continues at step 270. At step 270 if the user is inputting data into a textbox or message area 78 or 78a, then program execution continues at step 272 and microprocessor 12 updates the display 20 accordingly. For example, user input data via the alphanumeric data entry screen of FIG. 7 is processed here for entry of data into the textboxes of FIG. 2. Further, if the reply mode is active, user input data entered in message area 78 or 78a is transmitted to a messaging device currently engaged in reply mode operation with messaging device 10. If a user is viewing a previously received message and desires to add further comments or notes to the message in area 78, additional message information input is received by microprocessor 12 via touch sensitive overlay 22 and is appended into area 78 at step 272. Following step 272 execution returns to the calling routine. If at step 270 the user input is not textbox or message area data, then execution returns to the calling routine.

Figure 14:
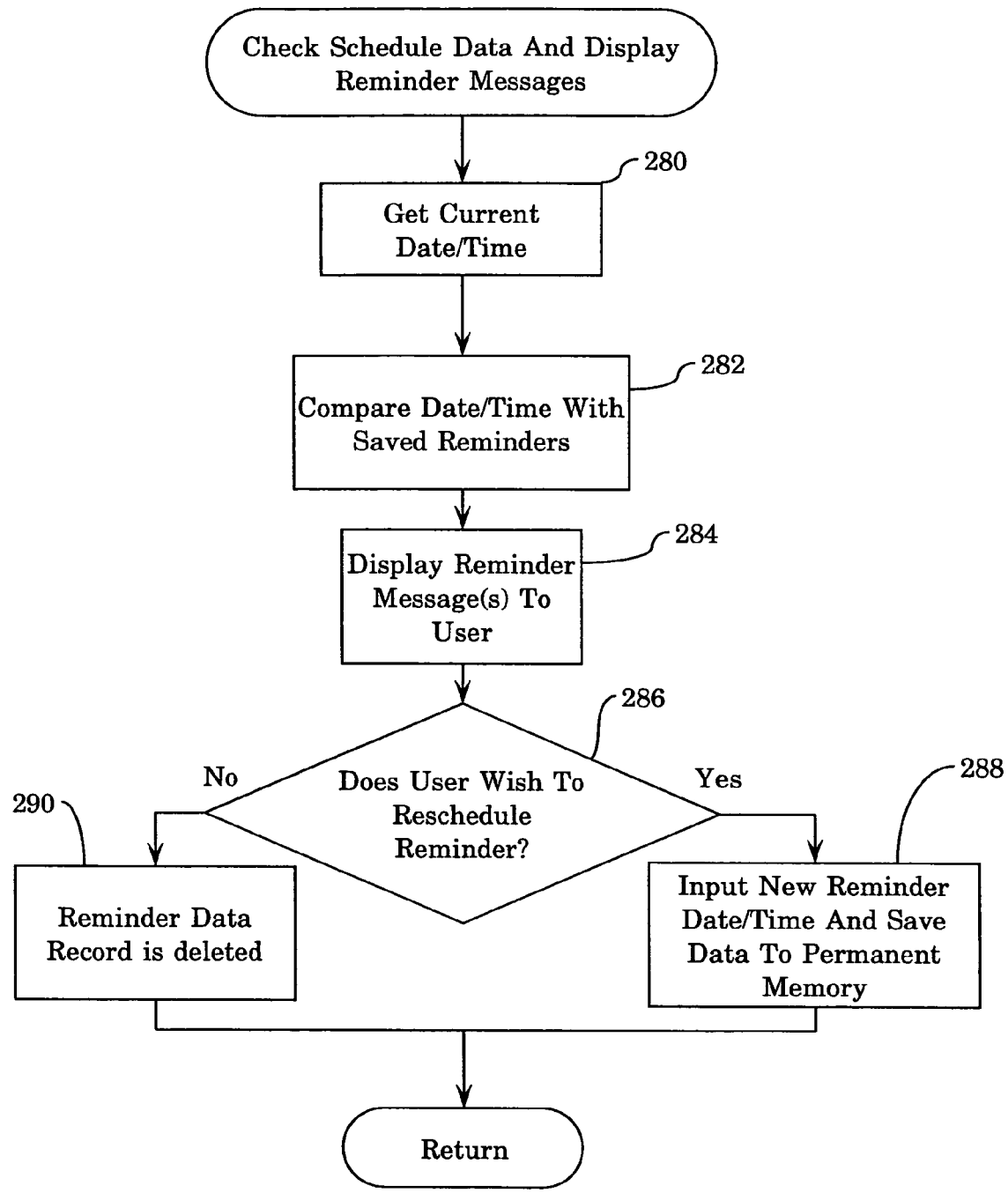
FIG. 14 is a flowchart for the Check Schedule Data step 210 of FIG. 11.

Referring now to FIG. 14, a flowchart for step 210 of FIG. 11 is shown. At step 280 microprocessor 12 obtains the current date/time from real time clock 14. Next at step 282 microprocessor 12 compares the current date/time with the date/time data in previously stored reminder data packets or records to ascertain whether any of the reminders have come due. Next at step 284, those reminder data packets that are due for display are displayed on display 20 (in serial fashion if more than one reminder is detected as due). Next at step 286 the user is prompted via a displayed message to cancel or reschedule the reminder. If the user wishes to reschedule the reminder, execution continues at step 288 and microprocessor 12 inputs new reminder date/time data from the user for the reminder data record currently of interest. If at step 286 the user response is to not reschedule the reminder message, then the reminder data record is deleted at step 290. Following both step 290 and step 288, execution returns.

Figure 15:
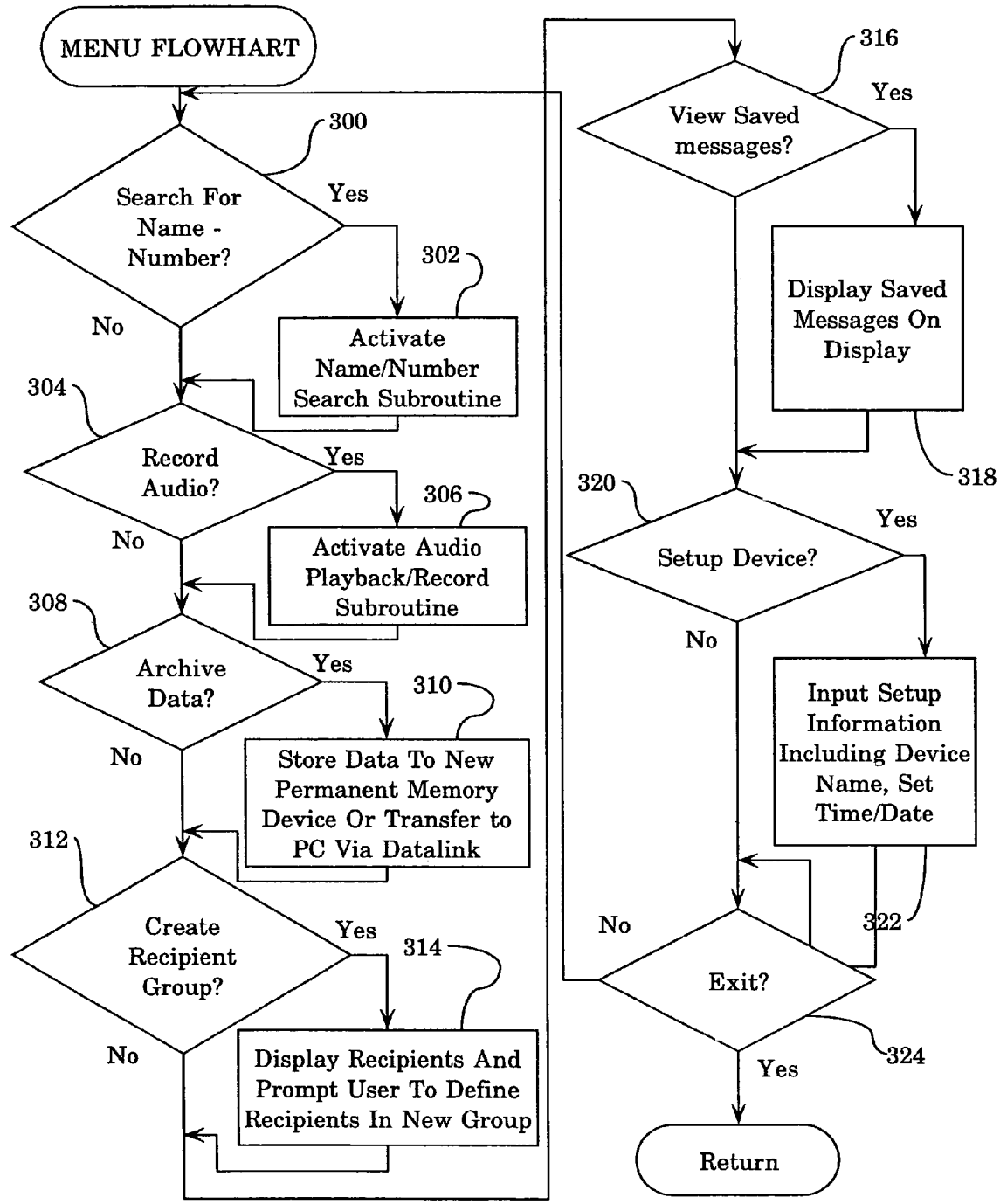
FIG. 15 is a flowchart for the MENU screen displayed at step 260 of FIG. 13.

Referring now to FIG. 15, a flowchart is shown for step 260 of FIG. 13 wherein the system MENU is displayed in response to the user tapping or activating pushbutton 104. The display 20 appears as is shown in FIG. 6 at this time. All user inputs discussed in regard to FIG. 15 are with respect to functions available in the MENU screen. If the input from the user at step 300 is an activation of pushbutton 110 the "Search For Name/Number" command, then execution continues at step 302. The search screen shown in FIG. 9 is displayed at step 302 and provides a mechanism for the user to enter alphanumeric search strings and find all stored message data packets containing the search string of interest. The operation of the search feature is also described above in regard to the discussion of FIG. 8. After step 302, program execution continues at step 304. If the user input command is activation of the Record Audio pushbutton 112, execution continues at step 306 and microprocessor 12 changes display 20 so that the Playback/Record Audio screen of FIG. 9 is shown. The commands available in the Playback/Record Audio screen are discussed above and enable the user to record, playback or delete an existing audio message. After step 306, execution continues at step 308. If the user input command is not pushbutton 112 at step 304, execution continues at step 308 thereafter. If at step 308 the user command is activation of pushbutton 114, then execution continues at step 310 where the user is prompted to activate the process of transferring saved message data packets to a removable compact flash memory device inserted into slot 46 of device 10 (see FIG. 3) or activating a transfer of stored message data packets to a personal computer via computer interface 24 for archiving data. Optionally, data archived on a removable compact flash memory card or on a personal computer may be restored or recovered to the flash memory of messaging device 10 in accordance with user input commands to restore data. Following step 310 execution continues at step 312. If at step 308 the user input was not an archive data command, execution continues thereafter at step 312.

At step 312 if the user input is pushbutton 116 (Create Recipient Group command) execution continues at step 314. At step 314, microprocessor 12 displays a listbox containing entries for all messaging devices detected since power up of messaging device 10. The user inputs an alphanumeric name of a new group and adds one or more detected messaging devices from the listbox to the newly created group. For example, those persons using a messaging device in marketing may be added to a new group named "marketing" so that any messages data packets sent to "marketing" are delivered to a group of recipients. New group definitions are stored in flash memory 16 and appear in listbox 50 as a potential message recipient. After step 314, execution continues at step 316. If at step 312 the user input is not a pushbutton 116 command input, then execution continues at step 316. If at step 316 the user input is pushbutton 118, the View Saved Messages option, then execution continues at step 318 and microprocessor 12 causes display 20 to display permanently saved message records saved via activation of the SAVE pushbutton 96. Saved messages are distinct from recently received or viewed messages as such are stored permanently for later recall, whereas new messages are not stored in the same area of memory. This scheme creates two groups of stored message data packets, permanently saved message records and new unviewed and/or viewed messages records that have not been "saved" via activation of pushbutton 96. The navigation pushbuttons 82, 84, 86 and 88 provide the user with a means to view the various saved message records. It is contemplated that the user activates the CLR pushbutton 90 to exit the viewing of saved message data packets mode and return messaging device 10 to the MENU screen of FIG. 6. After step 318, execution continues at step 320. If at step 316 the user input is not pushbutton 118, execution continues at step 320. At step 320 if the user has activated the Setup Device pushbutton 120, then execution continues at step 322 and the user is prompted by microprocessor 12 via display 20 to enter setup information including the device name (for example "John Doe") corresponding to the users name, and inputting current date/time data for use in initializing real time clock 14 to the current date/time. If the user changes the device name, messaging device 10 broadcasts this information via datalink 32 to all other messaging devices to update their logical unit and corresponding unit name data records. After step 322, execution continues at step 324. If the Exit Menu pushbutton 121 is activated by the user at step 324 then execution returns to the calling routine, otherwise execution continues at step 300. Upon return from the MENU mode of FIG. 6, messaging device returns to the mode of displaying the last displayed message prior to entering the MENU mode of operation.

While the invention has been illustrated and described in detail in the drawings and foregoing description of the preferred embodiment, the same is to be considered as illustrative and not restrictive in character, it being understood that only the preferred embodiment has been shown and described and that all changes and modifications that come within the spirit of the invention are desired to be protected.

What is claimed is:

1. A messaging device performing the following steps:

receiving caller ID data when a telephone call occurs;

displaying a formatted screen on an electronic display means including said caller ID data and form blanks for a user to enter additional data regarding the telephone call subject matter, said form blanks including at least one field capable of receiving an image of a handwritten note exactly as written by the user;

receiving message data from the user, said message data including information entered by the user into at least one of the form blanks;

receiving from the user a destination address of a messaging device corresponding to a messaging device used by an intended recipient of the message data, said intended recipient being someone other than the user;

receiving a send input from the user; and transmitting a message data packet comprised of said caller ID data, a date and time of the call, and said message data to the destination address.

2. The messaging device of claim 1 wherein the message data includes a sound input data signal captured by an audio input circuit means.

3. The messaging device of claim 1 further performing the following step: storing the message data packet for later retrieval from the recipient messaging device.

4. The messaging device of claim 1 wherein the message data includes an image of a note written in the handwriting of the user.

5. The messaging device of claim 1 which further performs the step of:

capturing an image of a handwritten note as written by the user.

6. The messaging device of claim 5 wherein the image is captured by a touch sensitive screen.

7. The messaging device of claim 6 wherein said touch sensitive screen is integrated into said device.

8. The messaging device of claim 6 wherein the image is compressed.

9. The messaging device of claim 1 wherein the caller ID data is calling number identification information.

10. The messaging device of claim 1 wherein the user enters said additional data using a user input device.

11. The messaging device of claim 10 wherein said user input device is a keyboard.

12. The messaging device of claim 10 wherein said user input device is a touch sensitive screen.

13. The messaging device of claim 1 wherein said message data packet is comprised of a plurality of unique data packets.

* * * * *